LEWIS C. WETZEL, OF WINDSOR, ONTARIO, CANADA, ASSIGNOR TO TOLEDO SCALE COMPANY, OF TOLEDO, OHIO, A CORPORATION OF NEW JERSEY.

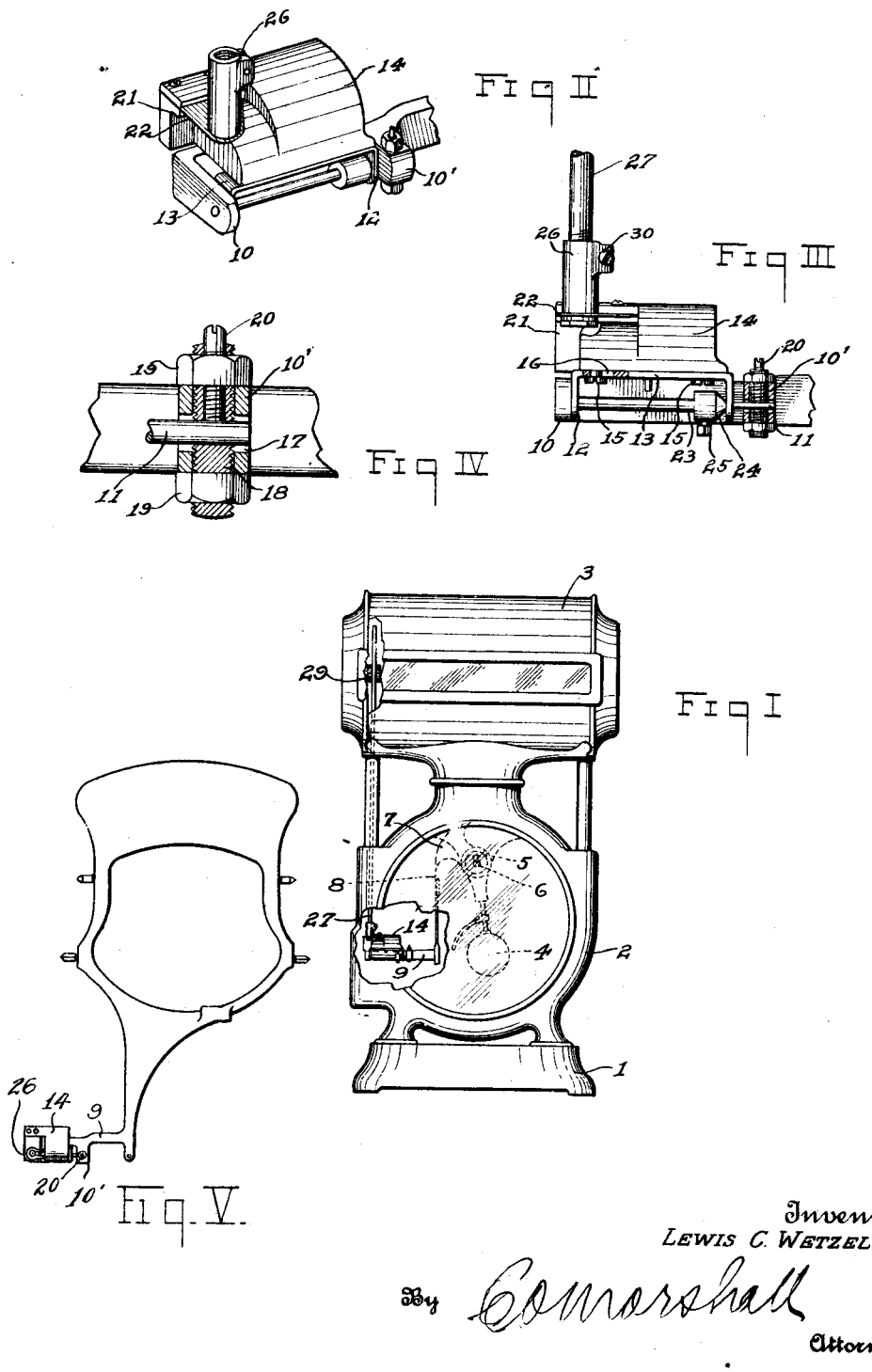

RACK SUPPORT.

Application filed May 5, 1921. Serial No. 467,101.

*To all whom it may concern:*

Be it known that I, LEWIS C. WETZEL, a citizen of the United States, residing at Windsor, Province of Ontario, Canada, have invented certain new and useful Improvements in Rack Supports, of which the following is a specification.

This invention relates to weighing scales, and particularly to scales of the type in which an indicator is operated from the weighing mechanism by means of a rack meshing with a pinion connected with the indicator.

The object of the invention is to provide an improved mounting for the rack bar, whereby the rack and pinion may be readily brought into alignment to secure substantially perfect mesh, and the object is accomplished by making the connection between the rack bar and the weighing mechanism adjustable angularly as well as perpendicularly relative to the plane of movement of the part to which it is connected.

Other objects and advantages will be apparent from the following description, in which reference is had to the accompanying drawings illustrating a preferred embodiment of my invention and wherein similar reference numerals designate similar parts throughout the several views.

In the drawings:—

Figure 1 is a rear elevation of a scale with the housing broken away to show the rack foot mounting embodying my invention, part of the weighing mechanism being shown in dotted lines;

Figure 2 is an enlarged perspective view of the rack foot mounting;

Figure 3 is a rear elevation of the rack foot shown in Figure 2, parts being broken away; and Figure 4 is an enlarged fragmentary detail view, partly in section, showing the rack foot adjusting means.

Figure 5 is a plan view of a scale lever having mounted thereon a rack foot embodying my invention.

By way of example I have shown my invention as applied to a scale having a base 1 which supports a housing 2 containing the load-offsetting mechanism of the scale. The indicator is of the type having a cylindrical chart and is contained within a substantially cylindrical casing 3 mounted upon the housing 2. The load-offsetting mechanism shown in dotted lines in Figure 1 consists essentially of a pendulum 4 suspended from knife-edge pivots 5 rockably mounted in bearings 6, the bearings 6 being rigidly secured upon brackets extending into the housing 2. The pendulum 4 has a power sector 7 rigidly connected thereto and a flexible steel band or ribbon 8 is fastened at its upper end to the power sector and passes downwardly over the arcuate surface thereof, being connected at its lower end to the nose of the main lever of the scale.

Extending laterally from the nose end of the main scale lever and rigid with respect thereto is an arm 9 carrying a pair of rearwardly projecting perforated lugs 10 and 10' to which the rack foot embodying my invention is pivoted by means of a rod 11 passing through the lugs 10 and 10' and through a pair of ears 12 depending from the ends of the plate 13. The plate 13 is secured by means of screws 15 to a horizontally extending portion of a comparatively heavy rack foot 14, the plate being provided with elongated slots 16 to receive the screws 15 and thereby provide for adjustment. By loosening the screws 15 lateral adjustment may be secured between the two members.

To prevent relative lateral movement of the rod 11 and the plate 13 a hollow sleeve 23 and a collar 24 are mounted upon the rod between the depending ears 12. It will be understood that the collar 24 is locked in position on the rod 11 by the set screw 25, the collar and sleeve thus serving to prevent any lateral movement between the members.

The projecting lug 10' has an enlarged horizontal aperture 17 therein, adapted to receive the end of the rod, and also a vertical aperture which contains a threaded stud 18, the threaded stud having a hole bored transversely therethrough to loosely receive the extremity of the rod 11. The vertical aperture in the lug 10' is unthreaded so that the threaded stud may be moved upwardly or downwardly therein by means of adjusting lock nuts 19 threaded upon opposite ends of the stud. By loosening one nut and tightening the other a vertical adjustment of the stud may be secured, this adjustment resulting in a slight angular adjustment of the rod 11. The upper portion of the stud 18 is longitudinally Suitably clamped in a kerf formed in the side portion 21 of the rack foot is a resilient plate 22 which extends outwardly to a position directly over the rod 11 and yieldingly supports the threaded lower end of the indicator operating rack bar 27, an internally threaded member 26 split longitudinally and provided with apertured lugs 28 being arranged to clamp the rack bar firmly to the plate 22. The rack bar may thus be threaded into the member 26 and turned into such position that its teeth correctly align and mesh with the teeth of the pinion 29. The apertured lugs 28 may then be drawn together by a locking screw 30 so that the rack bar is clamped against accidental turning movement.

The center of gravity of the rack foot is normally arranged in a plane slightly out of alignment with that of the rod 11 and so positioned that the weight of the rack foot tends to swing the rack bar forwardly to hold the rack in mesh with the pinion 29. Lateral adjustment can be effected by vertically shifting the position of the stud 18 until the rack bar is swung laterally sufficiently to lie in a plane parallel to the plane of movement of the pinion 29 and then moving the rack bodily, if necessary, by means of the screw and slot adjustment 15—16.

While it will be apparent that the illustrated embodiment of my invention herein disclosed is well calculated to adequately fulfill the objects primarily stated, it is to be understood that the invention is susceptible to variation, modification and change within the spirit and scope of the subjoined claims.

Having described my invention, I claim:

1. In a device of the class described, in combination, a shaft, a rack bar pivoted upon said shaft and extending at substantially right angles thereto, and means for adjusting the position of one end of said shaft to thereby effect an angular adjustment of said rack bar.

2. In a device of the class described, in combination, a lever, a shaft mounted thereon with its axis substantially perpendicular to the plane of movement of said lever, a one end of said shaft.

3. In a device of the class described, in combination, a lever, a shaft mounted thereon with its axis substantially perpendicular to the plane of movement of said lever, a rack bar pivotally supported on said shaft, means for bodily adjusting said rack bar longitudinally of said shaft, and means for vertically adjusting one end of said shaft.

4. In a device of the class described, in combination, a lever, a vertically adjustable member mounted thereon, a shaft having one end supported by said lever and its other end supported by said vertically adjustable member, and a rack bar mounted on said shaft.

5. In a device of the class described, in combination, a lever, a pair of projections on said lever, said projections being horizontally apertured, a shaft received in the apertures of said projections, one of said projections being vertically apertured, a threaded member received in the vertical aperture of said projection, said threaded member being apertured and receiving an end of said shaft, and nuts threaded on said member whereby it may be vertically adjusted to angularly adjust said shaft.

6. In a device of the class described, in combination, a lever, a pair of horizontally apertured projections therein, a shaft received in the apertures of said projections, one of said projections being vertically apertured, a member received in the vertical aperture of said projection, said member carrying one end of said shaft, and means for vertically adjusting said member.

7. In a device of the class described, in combination, a lever, a shaft carried by said lever, a yoke-like member pivotally mounted on said shaft, a sleeve and a collar mounted upon said shaft and interposed between the arms of said yoke-like member, means for adjustably fixing said collar to said shaft, and means for angularly adjusting said shaft on said lever.

LEWIS C. WETZEL.

Witnesses:
CHARLES C. NEALE,
HARRY O. EMSBERGER.